(12) United States Patent
Lee et al.

(10) Patent No.: US 11,692,490 B2
(45) Date of Patent: Jul. 4, 2023

(54) GAS TURBINE INNER SHROUD WITH ABRADABLE SURFACE FEATURE

(71) Applicant: DOOSAN HEAVY INDUSTRIES & CONSTRUCTION CO., LTD., Changwon-si (KR)

(72) Inventors: Jae Bin Lee, Changwon (KR); David Ohlschwager, Loxahatchee, FL (US); Gene Chong, Jupiter, FL (US)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 0 days.

(21) Appl. No.: 17/331,311

(22) Filed: May 26, 2021

(65) Prior Publication Data
US 2022/0381188 A1    Dec. 1, 2022

(51) Int. Cl.
*F01D 11/12* (2006.01)
*F02C 7/28* (2006.01)

(52) U.S. Cl.
CPC .............. *F02C 7/28* (2013.01); *F01D 11/122* (2013.01); *F05D 2220/32* (2013.01); *F05D 2240/55* (2013.01)

(58) Field of Classification Search
CPC ...... F02C 7/28; F01D 11/122; F05D 2220/32; F05D 2240/55
See application file for complete search history.

(56) References Cited

U.S. PATENT DOCUMENTS

| | | | | |
|---|---|---|---|---|
| 4,466,772 A | * | 8/1984 | Okapuu | F01D 11/08 415/173.5 |
| 5,472,315 A | | 12/1995 | Alexander et al. | |
| 6,830,428 B2 | * | 12/2004 | Le Biez | F01D 11/122 415/174.4 |
| 6,887,528 B2 | | 5/2005 | Lau et al. | |
| 7,448,843 B2 | * | 11/2008 | Pilecki, Jr. | F01D 11/001 415/199.5 |
| 7,600,968 B2 | | 10/2009 | Nelson et al. | |
| 7,614,847 B2 | | 11/2009 | Nelson et al. | |
| 7,749,565 B2 | * | 7/2010 | Johnson | F01D 11/122 427/448 |
| 8,814,507 B1 | * | 8/2014 | Campbell | F01D 11/24 415/173.1 |
| 8,939,716 B1 | * | 1/2015 | Lee | F01D 11/00 415/173.1 |
| 9,289,917 B2 | | 3/2016 | Bucci et al. | |
| 9,644,489 B1 | * | 5/2017 | Tham | B28B 1/001 |
| 10,969,684 B2 | * | 4/2021 | Schwab | G03F 7/7085 |

(Continued)

*Primary Examiner* — David E Sosnowski
*Assistant Examiner* — Theodore C Ribadeneyra
(74) *Attorney, Agent, or Firm* — Shook, Hardy & Bacon L.L.P.

(57) ABSTRACT

An inner shroud block component for a gas turbine. The inner shroud block has a radially inward facing surface with an abradable material applied thereto. The abradable material includes a zone of ridges that extend radially inwardly from the radially inward facing surface to minimize the clearance between the inner shroud block and the blade tip of a turbine blade. The abradable material may be ceramic and may be abraded by the blade tip if contact occurs between the blade tip and the inner shroud block. The zone of ridges extend along the radially inward facing surface in parallel to a direction of rotation of the turbine blade.

13 Claims, 8 Drawing Sheets

(56) References Cited

U.S. PATENT DOCUMENTS

| | | | |
|---|---|---|---|
| 11,111,806 B2* | 9/2021 | Clark | F01D 11/12 |
| 11,125,101 B2* | 9/2021 | Scherer | F01D 11/001 |
| 2003/0175116 A1* | 9/2003 | Le Biez | F04D 29/685 |
| | | | 415/173.4 |
| 2005/0232752 A1* | 10/2005 | Meisels | F01D 25/24 |
| | | | 415/116 |
| 2008/0273967 A1* | 11/2008 | Marini | F01D 11/122 |
| | | | 415/173.4 |
| 2010/0124608 A1* | 5/2010 | Johnson | F01D 11/122 |
| | | | 427/235 |
| 2010/0310353 A1* | 12/2010 | Yu | F04D 29/685 |
| | | | 415/220 |
| 2011/0171010 A1* | 7/2011 | Li | F01D 11/122 |
| | | | 415/173.1 |
| 2011/0255989 A1* | 10/2011 | Koyabu | F01D 11/24 |
| | | | 416/97 R |
| 2012/0034847 A1* | 2/2012 | Besse | B24D 5/02 |
| | | | 451/28 |
| 2012/0099972 A1* | 4/2012 | Guo | C23C 30/00 |
| | | | 427/454 |
| 2012/0099985 A1* | 4/2012 | Strock | F16J 15/445 |
| | | | 415/230 |
| 2013/0004305 A1* | 1/2013 | Giovannetti | F04D 29/162 |
| | | | 415/196 |
| 2013/0011238 A1* | 1/2013 | Liang | F01D 11/24 |
| | | | 415/115 |
| 2014/0023482 A1* | 1/2014 | Wada | F01D 11/00 |
| | | | 415/110 |
| 2014/0112753 A1* | 4/2014 | Zhang | F01D 11/122 |
| | | | 415/170.1 |
| 2014/0271157 A1* | 9/2014 | Harper | F01D 5/225 |
| | | | 415/186 |
| 2014/0286751 A1* | 9/2014 | Brunelli | F01D 11/24 |
| | | | 415/116 |
| 2015/0031272 A1* | 1/2015 | Fulton | F01D 11/122 |
| | | | 451/178 |
| 2015/0044035 A1* | 2/2015 | Cottom | C23C 28/3215 |
| | | | 428/215 |
| 2015/0240652 A1* | 8/2015 | Lee | F01D 11/122 |
| | | | 415/173.4 |
| 2015/0240653 A1* | 8/2015 | Lee | F01D 11/14 |
| | | | 415/173.4 |
| 2015/0337672 A1* | 11/2015 | McCaffrey | F01D 9/02 |
| | | | 415/173.1 |
| 2016/0236994 A1* | 8/2016 | Vetters | C04B 41/009 |
| 2017/0051625 A1* | 2/2017 | Slavens | F01D 25/005 |
| 2017/0051626 A1* | 2/2017 | Lee | F01D 11/08 |
| 2017/0298777 A1* | 10/2017 | Lamusga | F01D 11/14 |
| 2017/0370241 A1* | 12/2017 | Tham | B22C 7/02 |
| 2018/0156070 A1* | 6/2018 | Desforges | F01D 11/122 |
| 2018/0347392 A1* | 12/2018 | Lewis | F01D 11/24 |
| 2019/0010820 A1* | 1/2019 | Scherer | F01D 11/001 |
| 2019/0093499 A1* | 3/2019 | Sippel | F01D 11/122 |
| 2019/0107003 A1* | 4/2019 | Sheedy | F01D 11/122 |
| 2019/0186278 A1* | 6/2019 | Clum | F01D 11/001 |
| 2019/0186285 A1* | 6/2019 | Warren | F01D 11/122 |
| 2019/0360351 A1* | 11/2019 | Walston | F01D 11/122 |
| 2020/0040756 A1* | 2/2020 | Clark | F01D 11/08 |
| 2020/0095887 A1* | 3/2020 | Romanov | F01D 25/12 |
| 2020/0123922 A1* | 4/2020 | Strock | C23C 4/134 |
| 2020/0149477 A1* | 5/2020 | Barker | F02C 7/28 |

* cited by examiner

GAS TURBINE INNER SHROUD WITH ABRADABLE SURFACE FEATURE

TECHNICAL FIELD

The present invention generally relates to components for a gas turbine engine. More specifically, the present invention relates to a gas turbine inner shroud with an abradable surface feature.

BACKGROUND

Gas turbine engines, such as those used for power generation or propulsion, employ a series of turbine stages that extract usable energy from a flow of hot gas. The turbine stages typically include turbine blades having airfoils and shroud components that contain the flow of hot gas. While flow of hot gas around the surfaces of the airfoils is desirable, flow over a blade tip of the turbine blades is undesirable.

SUMMARY

This summary is intended to introduce a selection of concepts in a simplified form that are further described below in the detailed description section of this disclosure. This summary is not intended to identify key or essential features of the claimed subject matter, nor is it intended to be used as an aid in isolation to determine the scope of the claimed subject matter.

In brief, and at a high level, this disclosure describes an inner shroud component for a gas turbine. The inner shroud has a blade-facing surface with an abradable material applied to the blade-facing surface. The abradable material includes a plurality of ridges that extend across the blade-facing surface from a first side edge to a second side edge. The direction of extension of the plurality of ridges is parallel to a plane of rotation within which a turbine blade associated with the inner shroud rotates.

BRIEF DESCRIPTION OF THE DRAWINGS

The embodiments disclosed herein relate to compressor component airfoil designs and are described in detail with reference to the attached drawing figures, which illustrate non-limiting examples of the disclosed subject matter, wherein.

DETAILED DESCRIPTION

The subject matter of this disclosure is described herein to meet statutory requirements. However, this description is not intended to limit the scope of the invention. Rather, the claimed subject matter may be embodied in other ways, to include different steps, combinations of steps, features, and/or combinations of features, similar to those described in this disclosure, and in conjunction with other present or future technologies.

In brief, and at a high level, this disclosure describes an inner shroud component for a gas turbine. The inner shroud has a blade-facing surface with an abradable material applied to the blade-facing surface. The abradable material includes a plurality of ridges that extend across the blade-facing surface from a first side edge to a second side edge. The direction of extension of the plurality of ridges is parallel to a plane of rotation within which a turbine blade associated with the inner shroud rotates.

As used herein, the term "proximate" refers to a location of two or more objects being closely related in space. In some aspects, two objects are proximate one another when they are within one inch of each other.

The terms "axial" and "axially" refer to directions and orientations extending substantially parallel to a longitudinal axis of a rotary machine (for example, the axial direction refers to the direction of extension of a turbine shaft). The terms "radial" and "radially" refer to directions and orientations extending substantially perpendicular to the longitudinal axis of the rotary machine. The radial direction is normal to the axial direction.

Figure 1:
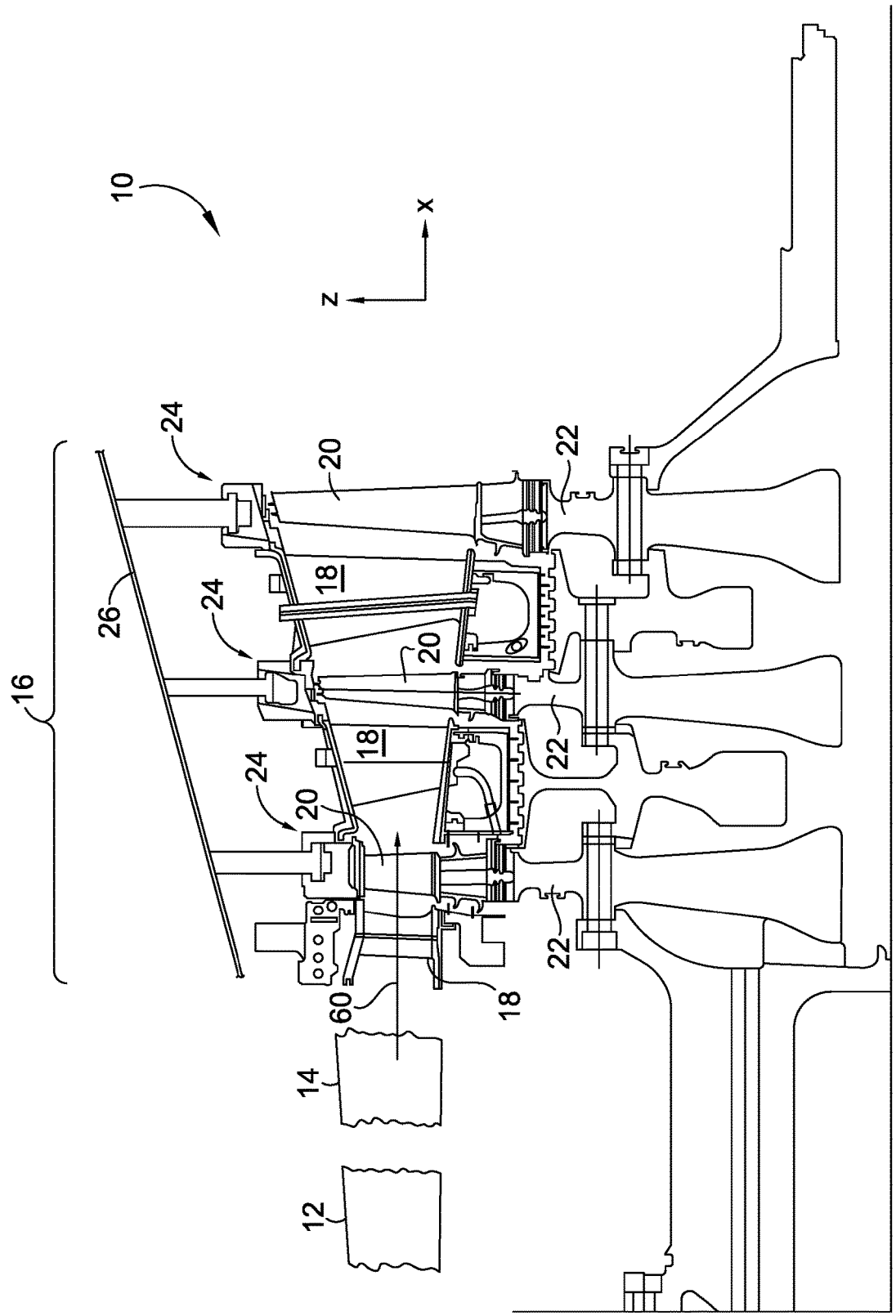
FIG. 1 depicts a schematic view if a gas turbine engine, in accordance with aspects hereof.

Turning now to FIG. 1, there is illustrated an aspect of a gas turbine engine 10. Certain components of the gas turbine engine 10 are shown schematically. For example, gas turbine engine 10 typically has at least a compressor section 12 (represented schematically), a combustor section 14 (represented schematically), and a turbine section 16. In the compressor section 12, the air is compressed and passed to the combustor section 14. In the combustor section 14, the pressurized air is mixed with fuel and ignited to generate hot, pressurized gas. This hot gas flows through a hot gas flow path (indicated by arrow 60) of the turbine section 16 and expands through the turbine section 16, where energy is extracted. The turbine section 16 may contain multiple turbine stages, each having a plurality of turbine nozzles 18, a plurality of turbine blades 20, a rotor disc 22, and a plurality of shroud components 24. The plurality of turbine blades 20 are coupled to the rotor disc 22 and extend in a radial direction Z therefrom towards the plurality of shroud components 24. The plurality of shroud components 24 may be coupled to a casing 26 surrounding the turbine section 16. The turbine section 16 depicted in FIG. 1 includes three turbine stages, but other aspects may include greater or fewer number of stages. A first stage of the turbine section 16 directly follows the combustor section 14. The second stage is downstream of the first stage in the axial direction X. Likewise, the third stage is downstream of the second stage in the axial direction X.

Figure 2:
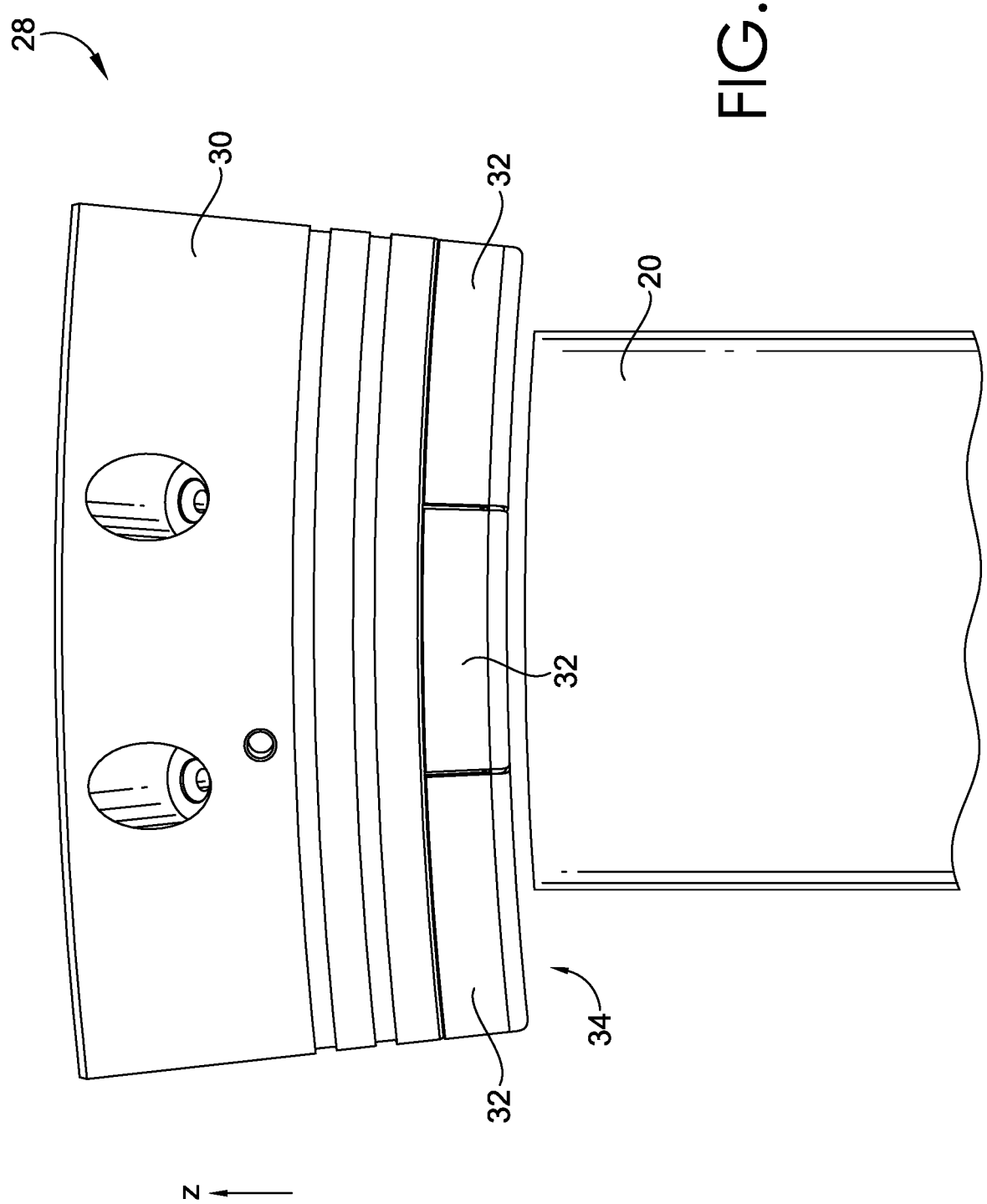
FIG. 2 depicts an axial view of an assembly of an outer shroud block and corresponding inner shroud blocks, in accordance with aspects hereof.
Figure 3:
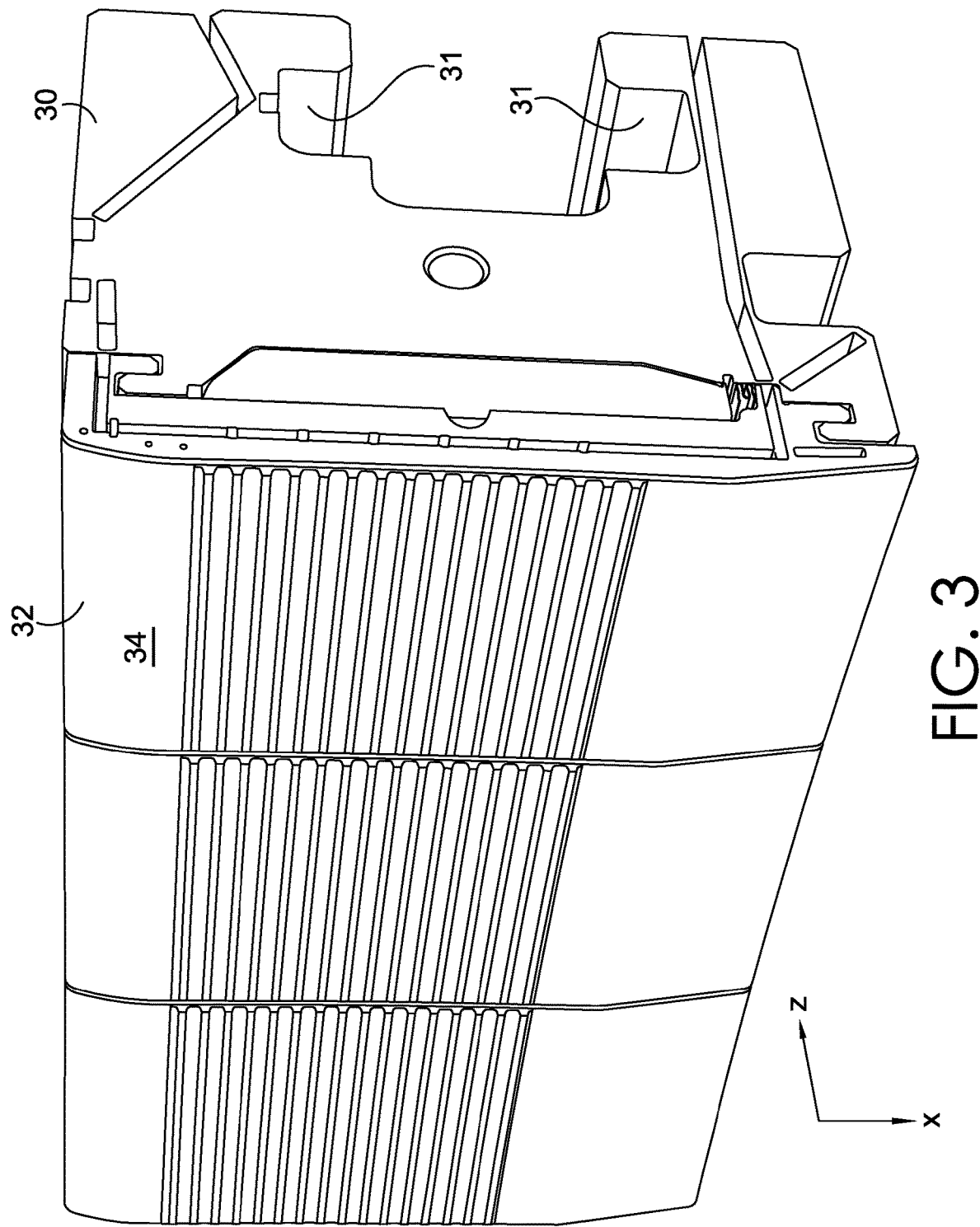
FIG. 3 depicts a perspective view of the assembly of FIG. 2, in accordance with aspects hereof.

Referring now to FIG. 2, there is illustrated an axial view of one aspect of an assembly 28 of an outer shroud block 30, and three inner shroud blocks 32 coupled to the outer shroud block 30. As will be understood by those of skill in the art, a number of the assemblies 28 are coupled together to form an annular ring, surrounding the hot gas path of a turbine. As viewed in FIG. 2, the hot gas path flows along an inward facing surface 34 of the inner shroud block 32 and around turbine blade 20. While three inner shroud blocks 32 are shown coupled to the outer shroud block 30, more, or fewer, inner shroud blocks 32 may be coupled to the outer shroud block 30. The outer shroud blocks 30 are coupled to the casing 26 of the gas turbine (as seen in FIG. 1). As best seen in FIG. 3, the outer shroud block 30 may have a lip 31 to facilitate coupling to the casing 26 of the turbine section 16.

Figure 4:
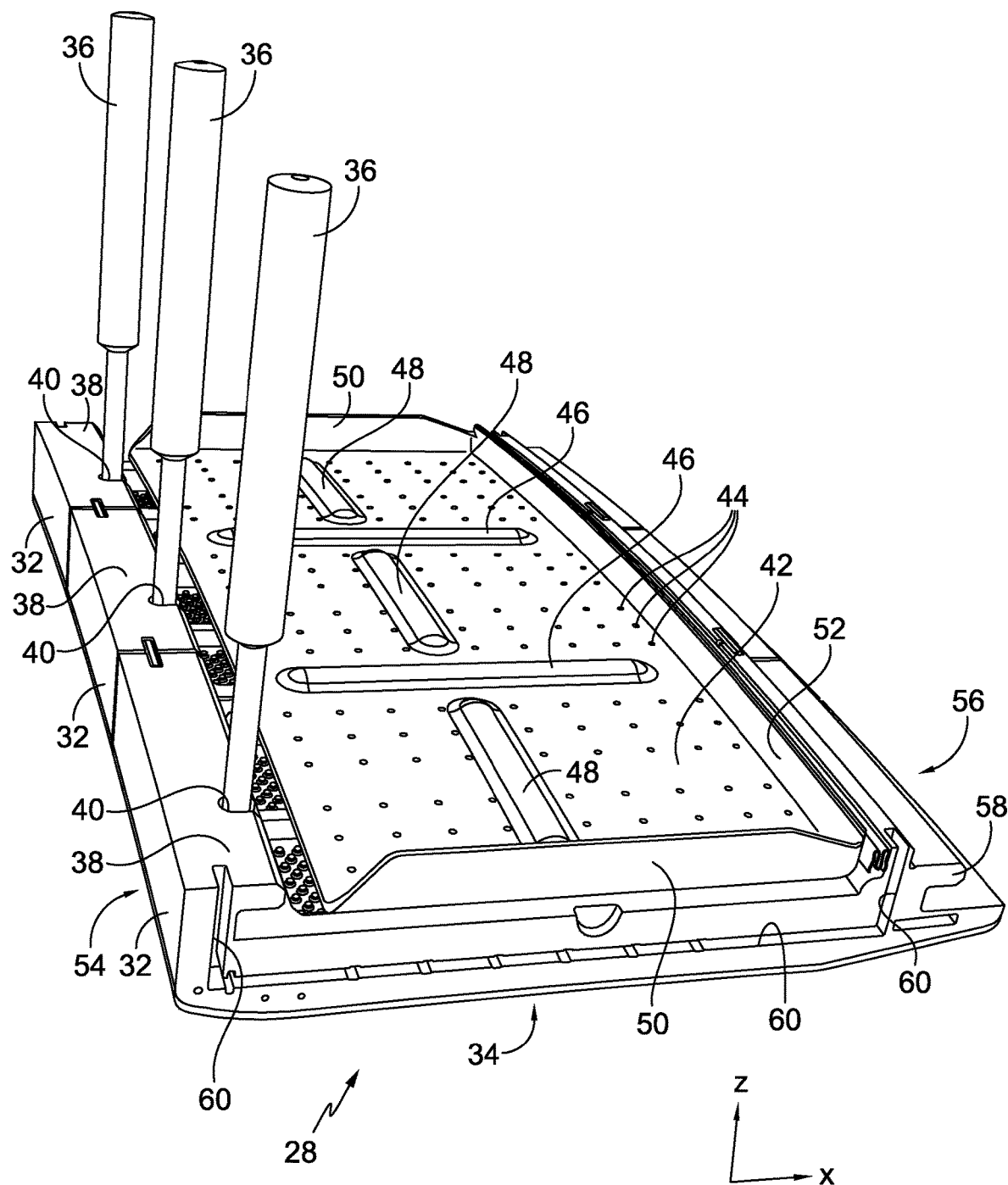
FIG. 4 depicts another perspective view of the assembly of FIG. 2, with the outer shroud block hidden, in accordance with aspects hereof.

FIG. 4 shows the assembly 28 without the outer shroud block 30 to show additional details of construction. As shown in FIG. 4, an anti-rotation pin 36 extends through the outer shroud block 30 to a forward hook 38 of each inner shroud block 32. As shown in FIG. 3, three anti-rotation pins 36 extend through the outer shroud block 30 and to a corresponding forward hook 38 of an inner shroud block 32. The forward hook 38, in some aspects, has an alignment notch 40 formed therein that receives an end of the anti-rotation pin 36. As also seen in FIG. 4, an impingement plate 42 is disposed between the outer shroud block 30 and the inner shroud block 32. In some aspects, the impingement plate 42 is coupled to the outer shroud block 30 (e.g., the impingement plate 42 may be welded to the outer shroud block 30). The impingement plate 42 includes a series of holes 44, through which cooling air is directed. Additionally, in some aspects, the impingement plate includes axial channels 46 and lateral channels 48 formed therein. The axial channels 46 are generally located adjacent a side coupling two inner shroud blocks 32. The impingement plate 42 may also have an extending lip 50 along the sides, where two adjacent outer shroud blocks 30 are coupled together, and a bottom, or aft, lip 52 extending along the aft edge of the impingement plate 42.

Figure 5:
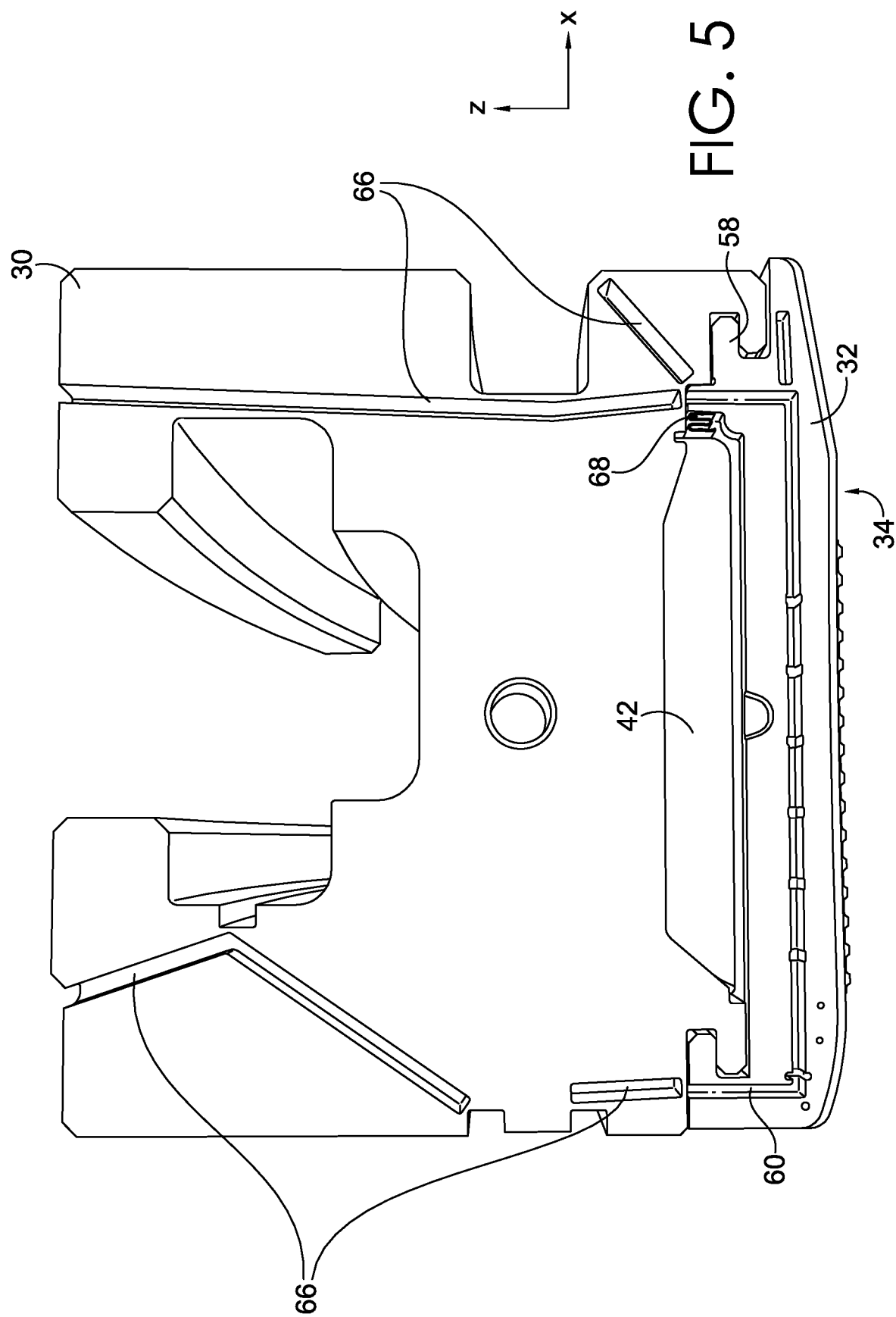
FIG. 5 depicts a side elevation view of the assembly of FIG. 2, in accordance with aspects hereof.
Figure 7:
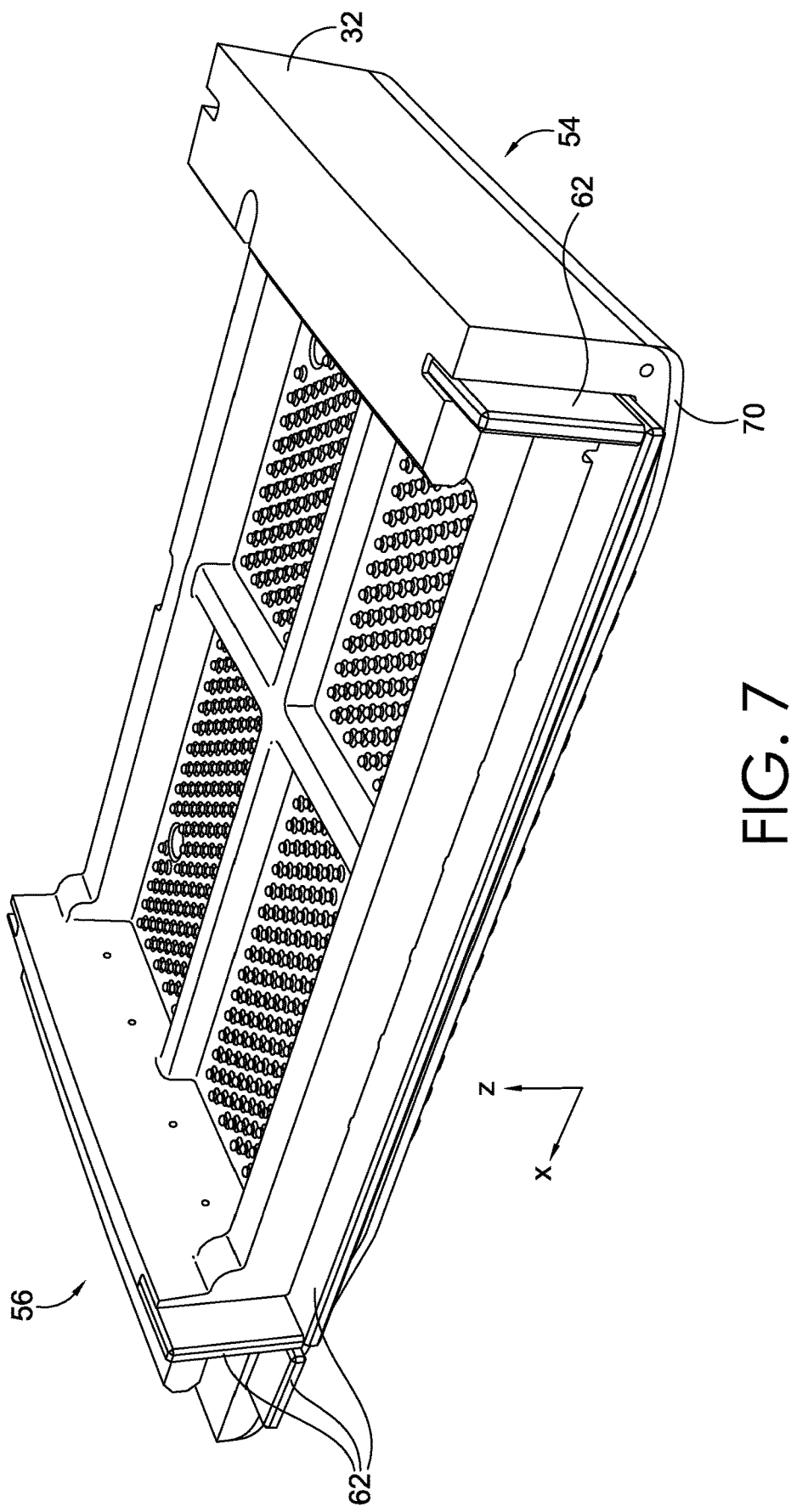
FIG. 7 depicts a perspective view of the inner shroud block of FIG. 6, having seal members inserted into a groove on one side of the inner shroud block, in accordance with aspects hereof.
Figure 8:
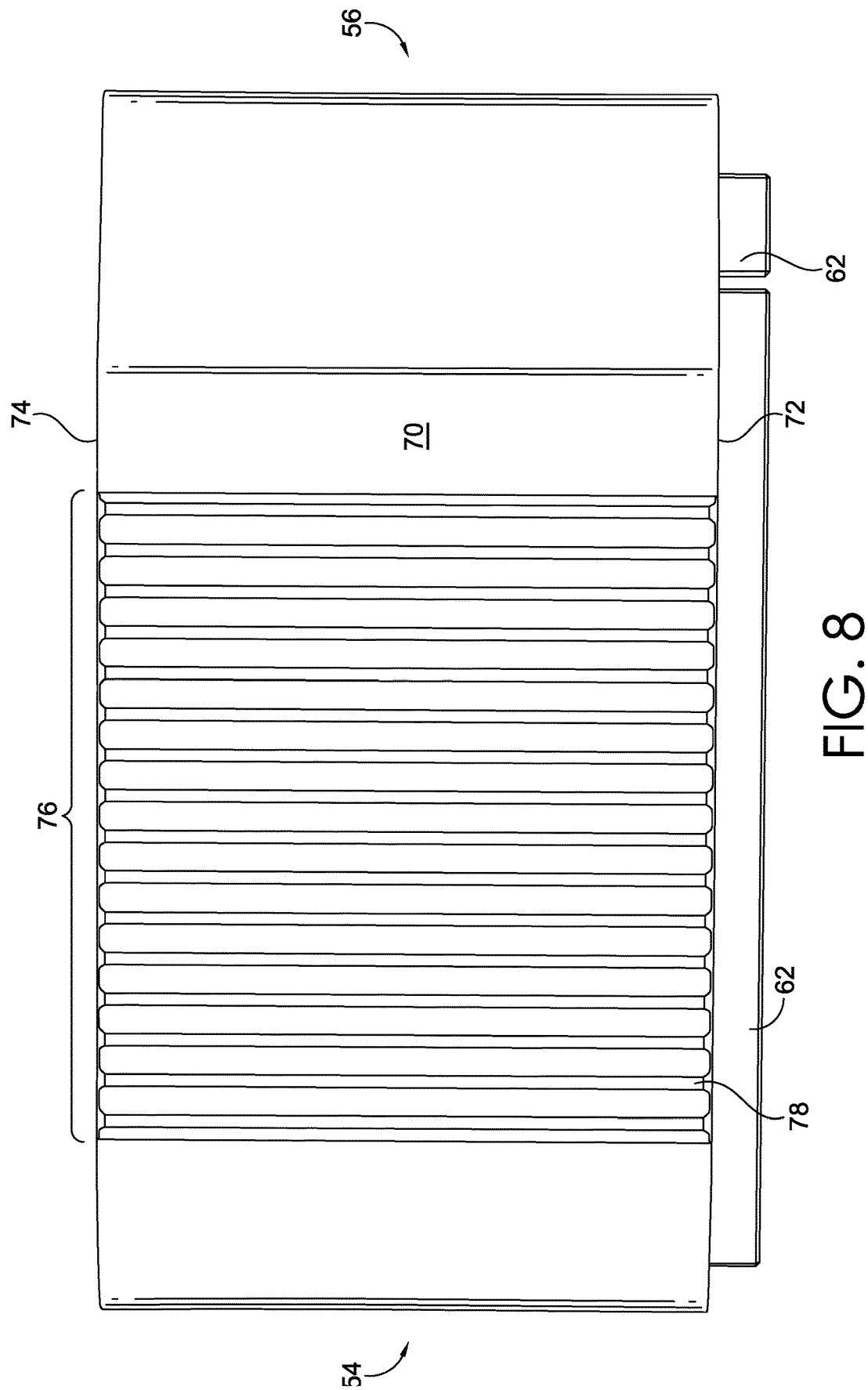
FIG. 8 depicts a bottom view of the inner shroud block of FIG. 7, in accordance with aspects hereof.

As seen in FIGS. 2 and 3, and as described above, each inner shroud block 32 has a radially inward facing surface 34 that is adjacent the hot gas path. Each inner shroud block 32 further has a forward end 54 opposite an aft end 56. The hot gas travels along the inward facing surface 34 from the forward end 54 to the aft end 56. In some aspects, the aft end 56 includes an aft hook 58. The forward hook 38 and the aft hook 58 are used in coupling the inner shroud block 32 to the outer shroud block 30. For example, the outer shroud block 30 may have reciprocal hooks configured to couple with the forward hook 38 and the aft hook 58. In some aspects, each side of the inner shroud block 32 has a groove 60 formed therein. The groove 60 may extend from the forward end 54, along the side, and to the aft end 56. As best seen in FIGS. 7 and 8, the groove 60 supports a number of seals 62. In some aspects, the seals 62 extend from the groove 60 of one inner shroud block 32 to the groove 60 of an adjacent inner shroud block 32. The seals 62 aid in blocking the flow of hot gas along the edges of adjacent inner shroud blocks 32. In addition, the groove 60 may include one or more lateral notches formed therein (best seen in FIGS. 4 and 6). The lateral notches extend into the side of the inner shroud block 32 slightly farther than does the groove 60. The lateral notches each permit a small amount of cooling air to pass from a plenum between the impingement plate 42 and the outward facing surface 64 (best seen in FIG. 7) to the hot gas side of the seals 62 to cool the structures present between adjacent inner shroud blocks 32 (e.g., sides, hot gas side of seals 62, etc.). Similarly, the outer shroud block 30 may include one or more grooves 66, as depicted in FIG. 5. The one or more grooves 66 may support a number of seals that extend from the one or more grooves 66 of one outer shroud block 30 to reciprocal grooves 66 of an adjacent outer shroud block 30. An aft seal 68 (e.g., a spring seal having a "W" shaped cross-section) may be used between the aft lip 52 of the impingement plate 42 and a surface forward of the aft hook 58 in the axial direction and between the inner shroud block 32 and the outer shroud block 30. The aft seal 68 may prevent or inhibit cooling air from escaping the plenum described above through any gaps that might be present between the aft hook 58 and the outer shroud block 30 (e.g., an aft hook of the outer shroud block).

Figure 6:
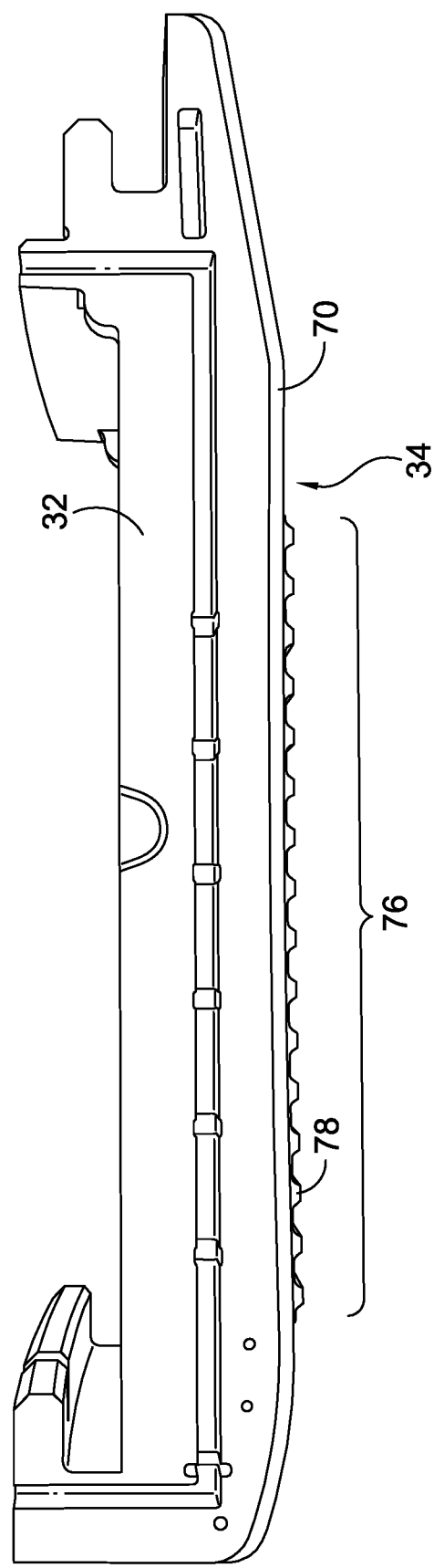
FIG. 6 depicts a side elevation view of an inner shroud block, in accordance with aspects hereof.

Referring to FIG. 6, the radially inward facing surface 34 of the inner shroud block 32 is coated with an abradable material 70. One example of an abradable material that is useful with the present invention includes a ceramic material. The abradable material 70 is applied to the radially inward facing surface 34 from the forward end 54 to the aft end 56 and from a first side edge 72 (best seen in FIG. 8) to a second side edge 74 (best seen in FIG. 8). In some aspects, the coating has a uniform thickness. In addition, the abradable material 70 includes a zone of ridges 76. The zone of ridges 76 optimizes the clearance between the inner shroud block 32 and an adjacent turbine blade 20. For example, the clearance between the inner shroud block 32 having the zone of ridges 76 and the blade tip is reduced, which reduces losses in turbine efficiency due to leakage of hot gas over a blade tip. Further, the zone of ridges 76 extends the useful life of the plurality of turbine blades 20 by limiting or eliminating blade tip wear. For example, applying an abradable material 70 to the radially inward facing surface 34 provides a way to control wear of the blade tip by allowing the blade tip to abrade the abradable material 70 when contact between the blade tip and the inner shroud block 32 occurs.

Each ridge 78 within the zone of ridges 76 extends in a lateral direction Y (best seen in FIG. 8). The lateral direction Y is normal to the axial direction X and the radial direction Z. In other words, the ridges 78 extend in a side-to-side direction relative to the inner shroud block 32. According to some aspects, the ridges 78 extend from the first side edge 72 to the second side edge 74. In other aspects, the ridges 78 extend only a partial distance across the radially inward facing surface 34. As is understood from FIG. 2, the turbine blades 20 rotate in a plane normal to a center axis. Each of the ridges 78 is parallel to the plane of rotation of the turbine blades 20. As best seen in FIG. 8, the zone of ridges 76 may include a platform 80 from which the ridges 78 extend. The platform 80 may comprise a thicker coating of abradable material 70. The ridges 78 may have a wider base proximate the radially inward facing surface 34 and a narrower distal end opposite the wider base. Grooves 82 may be present between the ridges 78.

It will be understood that certain features and sub-combinations are of utility and may be employed without reference to other features or sub-combinations. This is contemplated by and is within the scope of the claims. The described technology may be made without departing from the scope, it is to be understood that all matter described herein or illustrated in the accompanying drawings is to be interpreted as illustrative and not in a limiting sense.

The present invention has been described in relation to particular examples, which are intended in all respects to be illustrative rather than restrictive. From the foregoing, it will be seen that this invention is one well adapted to attain all the ends and objects set forth above, together with other advantages which are obvious and inherent to the inner shroud block. It will be understood that certain features and subcombinations are of utility and may be employed without reference to other features and subcombinations. This is contemplated by and is within the scope of the claims.

Some aspects of this disclosure have been described with respect to the examples provided in the figures. Additional aspects of the disclosure will now be described that may be related subject matter included in one or more claims or embodiments of this application at the time of filing, or one or more related applications, but the claims or embodiments are not limited to only the subject matter described in the below portions of this description. These additional aspects may include features illustrated by the figures, features not illustrated by the figures, and any combination thereof. When describing these additional aspects, reference may be made to elements depicted by the figures for illustrative purposes.

As used herein and in connection with the claims listed hereinafter, the terminology "any of embodiments" or similar variations of said terminology is intended to be interpreted such that features of claims/embodiments may be combined in any combination. For example, an exemplary embodiment 4 may indicate the method/apparatus of any of embodiments 1 through 3, which is intended to be interpreted such that features of embodiment 1 and embodiment 4 may be combined, elements of embodiment 2 and embodiment 4 may be combined, elements of embodiment 3 and 4 may be combined, elements of embodiments 1, 2, and 4 may be combined, elements of embodiments 2, 3, and 4 may be combined, elements of embodiments 1, 2, 3, and 4 may be combined, and/or other variations.

The following embodiments are aspects contemplated herein.

Embodiment 1. A component for a gas turbine engine, the component comprising an inner surface extending in an axial direction of the gas turbine engine, the inner surface having a first side edge extending in the axial direction and a second side edge opposite the first side edge and also extending in the axial direction and a plurality of ridges projecting out from the inner surface, the plurality of ridges extending across the inner surface in a direction normal to the axial direction of the gas turbine engine.

Embodiment 2. The component of embodiment 1, wherein the inner surface and the plurality of ridges are comprised of an abradable material.

Embodiment 3. The component of any of embodiments 1-2, wherein the abradable material is a ceramic material.

Embodiment 4. The component of any of embodiments 1-3, wherein the component comprises an inner shroud block.

Embodiment 5. The component of any of embodiments 1-4, wherein each ridge of the plurality of ridges includes a first sidewall, a second sidewall opposite the first sidewall, and an end wall extending between the first sidewall and the second sidewall.

Embodiment 6. The component of any of embodiments 1-5, wherein the plurality of ridges each project radially inwardly towards a centerline of the gas turbine engine.

Embodiment 7. The component of any of embodiments 1-6, wherein the plurality of ridges each extend from the first side edge of the inner surface to the second side edge of the inner surface.

Embodiment 8. A gas turbine engine comprising a casing, a plurality of outer shroud blocks coupled to the casing in an annular array about a centerline of the gas turbine engine, at least one inner shroud block coupled to each outer shroud block of the plurality of outer shroud blocks, each inner shroud block having an inner surface disposed towards the centerline of the gas turbine engine, a plurality of turbine blades circumferentially spaced around the centerline of the gas turbine engine, the plurality of turbine blades configured to rotate in a first direction about the centerline of the gas turbine engine, and a plurality of ridges projecting radially inward from the inner surface, the plurality of ridges extending laterally across the inner surface in parallel to the first direction.

Embodiment 9. The gas turbine engine of embodiment 9 further comprising the plurality of turbine blades each having a blade tip at a radially distal end of said blades.

Embodiment 10. The gas turbine engine of any of embodiments 8-9, wherein the plurality of turbine blades are sized such that under cold, non-operating conditions of the gas turbine engine the blade tips are spaced away from the plurality of ridges.

Embodiment 11. The gas turbine engine of any of embodiments 8-10, wherein under operating conditions of the gas turbine engine thermal expansion of the plurality of turbine blades causes the blade tips to be positioned immediately adjacent the plurality of ridges.

Embodiment 12. The gas turbine engine of any of embodiments 8-11, wherein the plurality of ridges are comprised of an abradable material.

Embodiment 13. The gas turbine engine of any of embodiments 8-12, wherein under operating conditions contact between the blade tips and the plurality of ridges abrades a portion of the plurality of ridges.

Embodiment 14. The gas turbine engine of any of embodiments 8-13, wherein the plurality of ridges extend in the same direction as the blade tips rotate.

Embodiment 15. The gas turbine engine of any of embodiments 8-14, wherein three inner shroud blocks are circumferentially aligned with, and coupled to, each outer shroud block.

Embodiment 16. The gas turbine engine of any of embodiments 8-15, wherein the plurality of ridges on a first inner shroud block are aligned with a respective plurality of ridges on a second inner shroud block positioned adjacent to the first inner shroud block.

Embodiment 17. The gas turbine engine of any of embodiments 8-16, wherein the plurality of ridges extend in a direction normal to an axial direction of the gas turbine engine.

Embodiment 18. The gas turbine engine of any of embodiments 8-17, wherein the plurality of ridges extend in a direction parallel to a plane of rotation of the plurality of turbine blades.

Embodiment 19. The gas turbine engine of any of embodiments 8-18, wherein the plurality of ridges comprises at least sixteen ridges.

Embodiment 20. The gas turbine engine of any of embodiments 8-19, wherein a groove is positioned between each adjacent ridge of the plurality of ridges.

Embodiment 21. Any of the aforementioned embodiments 1-20, in any combination.

The subject matter of this disclosure has been described in relation to particular embodiments, which are intended in all respects to be illustrative rather than restrictive. Alternative embodiments will become apparent to those of ordinary skill in the art to which the present subject matter pertains without departing from the scope hereof. Different combinations of elements, as well as use of elements not shown, are also possible and contemplated.

What is claimed is:

1. A gas turbine engine comprising:
 a casing;
 a plurality of outer shroud blocks having a forward lip and a rearward lip, each of the plurality of outer shroud blocks coupled to the casing by the respective forward lip and the respective rearward lip to form an annular array about a centerline of the gas turbine engine;

at least one inner shroud block coupled to each outer shroud block of the plurality of outer shroud blocks, each inner shroud block having an inner surface disposed towards the centerline of the gas turbine engine, and each side of the inner shroud block having a groove formed therein;

an impingement plate comprising a rearward lip, the impingement plate disposed between the outer shroud block and the at least one inner shroud block;

a plurality of turbine blades circumferentially spaced around the centerline of the gas turbine engine, the plurality of turbine blades configured to rotate in a first direction about the centerline of the gas turbine engine;

a plurality of ridges projecting radially inward from the inner surface, the plurality of ridges extending laterally across the inner surface in parallel to the first direction;

a first seal disposed between the rearward lip of the impingement plate and the at least one inner shroud block; and a second seal extending from the groove of one inner shroud block to the groove of an adjacent inner shroud block.

2. The gas turbine engine of claim 1 further comprising the plurality of turbine blades each having a blade tip at a radially distal end of said blades.

3. The gas turbine engine of claim 2, wherein the plurality of turbine blades are sized such that under cold, non-operating conditions of the gas turbine engine the blade tips are spaced away from the plurality of ridges.

4. The gas turbine engine of claim 3, wherein under operating conditions of the gas turbine engine thermal expansion of the plurality of turbine blades causes the blade tips to be positioned immediately adjacent the plurality of ridges.

5. The gas turbine engine of claim 4, wherein the plurality of ridges are comprised of an abradable material.

6. The gas turbine engine of claim 5, wherein under operating conditions contact between the blade tips and the plurality of ridges abrades a portion of the plurality of ridges.

7. The gas turbine engine of claim 2, wherein the plurality of ridges extend in the same direction as the blade tips rotate.

8. The gas turbine engine of claim 1, wherein three inner shroud blocks are circumferentially aligned with, and coupled to, each outer shroud block.

9. The gas turbine engine of claim 8, wherein the plurality of ridges on a first inner shroud block are aligned with a respective plurality of ridges on a second inner shroud block positioned adjacent to the first inner shroud block.

10. The gas turbine engine of claim 1, wherein the plurality of ridges extend in a direction normal to an axial direction of the gas turbine engine.

11. The gas turbine engine of claim 10, wherein the plurality of ridges extend in a direction parallel to a plane of rotation of the plurality of turbine blades.

12. The gas turbine engine of claim 1, wherein the plurality of ridges comprises at least sixteen ridges.

13. The gas turbine engine of claim 1, wherein a groove is positioned between each adjacent ridge of the plurality of ridges.

* * * * *